Jan. 9, 1968
H. E. CLUFF ET AL
3,362,256
COMBINATION ACCESSORY DRIVE AND
ENGINE STARTING MECHANISM
Original Filed Dec. 13, 1961
2 Sheets-Sheet 2
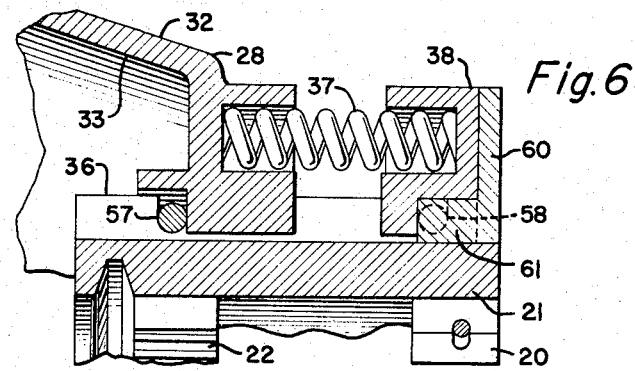
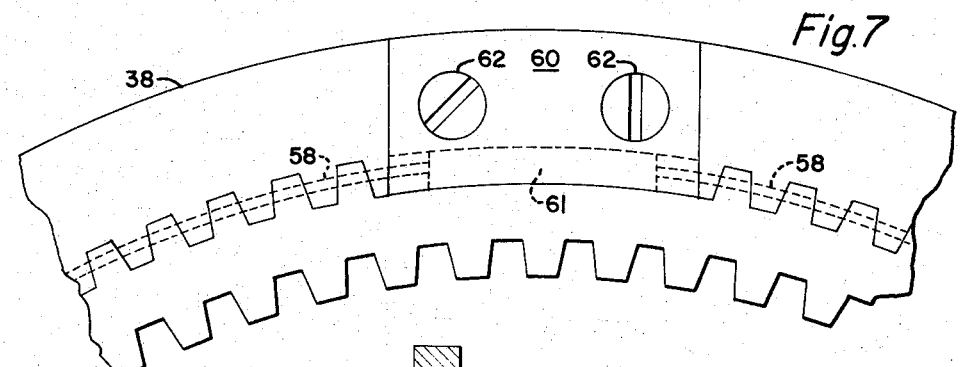
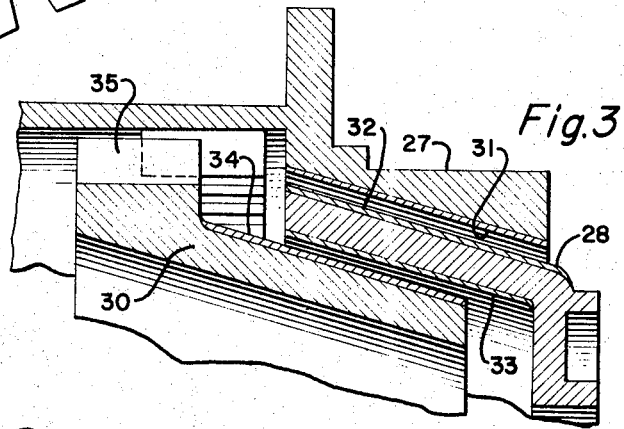
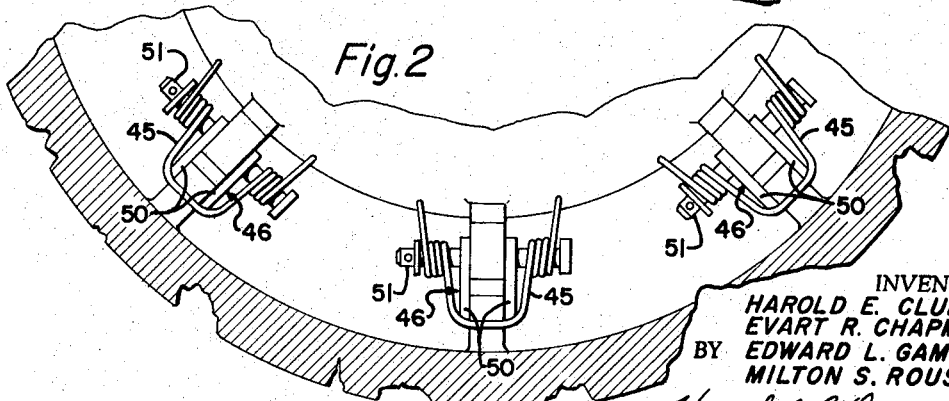
INVENTORS
HAROLD E. CLUFF
EVART R. CHAPMAN
BY EDWARD L. GAMMILL
MILTON S. ROUSH
Herschel C. Omohundro
ATTORNEY

United States Patent Office 3,362,256
Patented Jan. 9, 1968

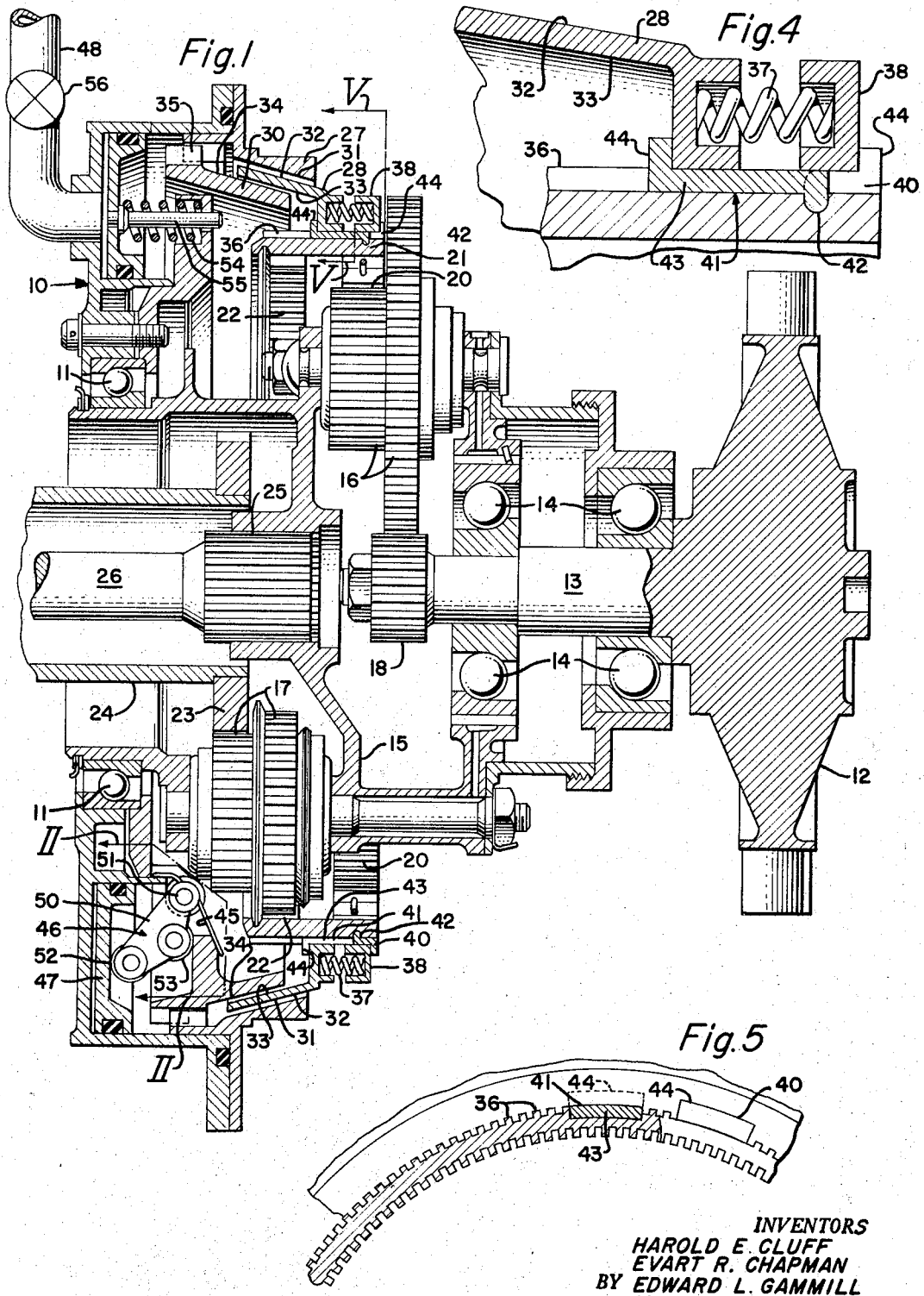

3,362,256
COMBINATION ACCESSORY DRIVE AND
ENGINE STARTING MECHANISM
Harold E. Cluff, Evart R. Chapman, Milton S. Roush, and Edward L. Gammill, Phoenix, Ariz., assignors to The Garrett Corporation, Los Angeles, Calif., a corporation of California
Continuation of application Ser. No. 411,668, Nov. 6, 1964, which is a continuation of application Ser. No. 159,000, Dec. 13, 1961. This application Mar. 1, 1966, Ser. No. 530,897
7 Claims. (Cl. 74—675)

This application is a continuation of application Ser. No. 411,668, filed Nov. 6, 1964, entitled, Cone-Type Brake Mechanism, which in turn is a continuation of application Ser. No. 159,000, filed Dec. 13, 1961, entitled, Cone-Type Brake Mechanism, both now abandoned.

This invention relates generally to brake devices. More specifically, it relates to brake devices adapted for use in a combination constant speed drive and engine starter of the type shown in Patent No. 2,908,189, issued Oct. 13, 1959, to Wilton E. Parker et al. Still more specifically this invention relates to apparatus for rendering brake devices of the above-mentioned type more efficient.

In the combination constant speed drive and engine starting mechanism mentioned above, use is made of planet gears mounted on a support connected for power transmission to and from the engine. The planet gears mesh with ring gear means and a sun gear which is driven by a fluid turbine. In the engine starting operation of the mechanism, the ring gear means is held stationary so that power will be transmitted with the proper torque requirement from the wheel of the turbine through the planet gears and their supporting member to the engine. A brake device is provided to hold the ring gear means stationary. At certain times, when it is necessary to perform an engine starting operation, the operating parts of the engine, and consequently the planet gear support and ring gear means, may be rotating at a relatively high rate. The brake device must therefore stop the ring gear means before the engine starting operation can be performed. This ring gear braking function generates high heat, which in past devices has caused galling and premature failure of brake parts. It is therefore an object to provide brake means which will dissipate the heat so generated and improve the wearing characteristics of the brake parts.

Also, in the combination constant speed drive and engine starting mechanism the brake device is operated by fluid pressure, as is also the power unit or turbine employed to start the engine after the brake device has been actuated. It has been found, in the operation of the combination constant speed drive and starter prior to the present invention, that after the application of fluid pressure to the brake to effect its operation the introduction of fluid pressure from the same source to the power unit of the starter would cause a reduction in the fluid pressure for the brake, with the result of releasing the parts of the apparatus which must be held stationary during the engine starting phase. Otherwise, faulty operation and damage to the apparatus would inevitably result.

It is an object of the present invention to overcome the above-mentioned disadvantages in prior apparatus by providing a brake mechanism in which such forces, to effect the operation of the brake, will be developed that sufficient braking force will remain even though the fluid pressure utilized to operate the brake may be partially reduced.

Another object of this invention is to provide a brake mechanism having a plurality of relatively movable members with brake surfaces, a fluid pressure responsive element for imparting movement to at least one of the members to cause engagement of the brake surfaces, and force amplifying means between the fluid pressure responsive element and the member it moves, so that even though the fluid pressure initially applied be reduced, ample braking force to perform the desired function will be developed.

Another object of this invention is to provide a brake mechanism having a plurality of relatively movable members with brake surfaces, a fluid pressure responsive piston for imparting movement to one of the members to cause engagement of the brake surfaces, and cam and lever means between the piston and the member it moves, the lever means being so arranged that the force transmitted by the piston to the movable member will be amplified.

Still another object of the invention is to provide a brake mechanism with a plurality of relatively movable members having cooperative brake surfaces, the latter being treated with materials having high heat dissipating characteristics and good bearing characteristics as well as the required friction braking characteristics, so that the effective life of the mechanism will be prolonged and the lubricating medium for the device equipped with the brake mechanism will be preserved.

A further object of the invention is to provide a brake mechanism for use in apparatus in which a lubricating medium is employed, the cooperating braking surfaces being treated with silver and molybdenum to improve their wearing characteristics and reduce or eliminate the contamination of the lubricating medium.

A still further object of the invention is to provide a brake mechanism having a pair of relatively movable members with braking surfaces and a third member with a portion having opposed braking surfaces, such portion being disposed between the braking surfaces of said pair of members to be clamped therebetween, the third member being mounted on a support for axial and rotary movement and having a novel means for retaining such third member on the support and limiting the axial movement thereof.

Another object of the invention is to treat one of the engaging braking surfaces of the mechanism mentioned in the previous paragraphs by plating with a relatively soft, highly heat-conductive metal, and another of the surfaces with a relatively hard, oil pervious metal, sprayed or otherwise applied, the first-mentioned metal serving to dissipate the heat generated and the other metal serving to retain a cooling lubricating medium which improves the bearing functions, the latter metal also serving to retain any particles of the first metal which tend to melt or otherwise separate from the first surface, thus reducing the contamination of the lubricating medium.

Other objects and advantages will be made apparent by the following description and the accompanying drawings in which the invention has been illustrated in one of its more practical forms.

In the drawings:

FIG. 1 is an axial sectional view taken through certain portions of a combined constant speed drive and engine starter mechanism formed in accordance with the present invention;

FIG. 2 is a vertical transverse sectional view taken through the mechanism shown in FIG. 1 on the plane indicated by the line II—II of that figure;

FIG. 3 is a detail sectional view on an enlarged scale taken through brake elements employed in the mechanism shown in FIG. 1;

FIG. 4 is also a detail sectional view on an enlarged scale taken through the mounting for one of the brake elements used in the mechanism shown in FIG. 1;

FIG. 5 is a vertical transverse sectional view taken on the plane indicated by the line V—V of FIG. 1;

FIG. 6 is a view similar to FIG. 4 showing a modified form of retaining means utilized on the mounting for the brake element; and FIG. 7 is an end elevational view of a portion of the retaining means and brake element shown in FIG. 6.

Referring more particularly to the drawings, FIG. 1 shows portions of a combination constant speed drive and engine starting mechanism which are necessary for an understanding of the present invention. This mechanism includes a housing 10, only a portion of which has been illustrated. This housing has internal structure for receiving bearings 11, which in turn form the rotatable support of other parts of the device. As indicated by the name, the combination constant speed drive and engine starting mechanism is provided for the purpose of transmitting rotary motion from an engine (not shown) and another prime mover (in this instance an air turbine 12) to an accessory such as an alternator (not shown) used in the operation of the engine. The alternator may also furnish electrical power for other mechanisms.

The turbine 12 includes a wheel to which air is supplied from a suitable source to effect its rotation. This wheel has a shaft 13 projecting therefrom, the shaft being received by bearings 14 to effect its rotatable support. The bearings 11 and 14 also support a carrier mechanism 15, which in turn rotatably supports a plurality of sets of planetary gears 16 and 17. Each set of planetary gears has a large gear and a smaller gear secured for rotary movement together. The larger gear on one set 16 of planetary gears meshes with a pinion 18 formed on or otherwise secured to the turbine wheel shaft 13. The smaller gear on the set 16 meshes with an internal ring gear 20 which forms part of a ring gear assembly 21.

Ring gear assembly 21 includes a second internal ring gear 22 with which the larger gear of the set 17 of planteary gears is in meshing relationship. The smaller gear on this set meshes with a sun gear 23 carried by a tubular shaft 24 connected with or forming a part of an alternator (not shown). The planetary gear carrier 15 is connected by suitable splines 25 with a shaft 26 extending through the alternator shaft 24 and connected for operation with a rotatable element of the engine (not shown) provided with the combination constant speed drive and engine starting mechanism.

As pointed out in the patent previously mentioned, power is transmitted by shafts 26 and 13, respectively, to the carrier for the planetary gear elements and to certain of such gear elements for transmission to the ring gear assembly 21. This assembly in turn transmits power to other gears of the planetary sets to effect the rotation of the alternator shaft 24.

In one of the operations of the combination constant speed drive and engine starting mechanism, the ring gear assembly is held stationary, so that power may be transmitted from the turbine wheel 12 through one set of planetary gears directly to the shaft 26 to initiate the operation of the engine. In this operation the sun gear 18 on the turbine wheel shaft rotates the larger gear of the set 16 of planetary gears, and the smaller gear of this set reacts against the internal ring gear 20, causing the carrier 15 to revolve. Since this carrier is splined directly to shaft 26, this shaft will also revolve and transmit rotary motion to the engine. To hold the ring gear assembly 21 stationary, the brake mechanism forming the subject matter of the invention has been provided.

This brake mechanism includes a plurality of braking elements separately identified by the numerals 27, 28 and 30. Element 27 is connected with and forms a part of the housing 10. It includes an internal frusto-conical braking surface 31. Element 28 has a flangelike portion which is provided with external and internal frusto-conical braking surfaces 32 and 33, respectively, the latter facing an exterior frusto-conical braking surface 34 formed on the element 30. Element 30 is guided by suitable splines or keys 35 for axial movement in the housing 10, the surface 34 being spaced from the surface 31 in the housing. The surfaces 31–34, inclusive, are inclined at the same angle, so that element 30 can be moved toward element 27 and cause engagement of surface 31 with surface 32 and surface 33 with surface 34. Element 28 is also mounted for limited axial movement on the ring gear assembly 21 by suitable keys or splines 36. These splines insure the rotary movement of element 28 with the ring gear assembly 21, and, of course, cause the braking or holding operation of the ring gear assembly when element 28 is squeezed between elements 27 and 30.

Element 28 is normally urged out of contact with element 27 by plurality of coil springs 37 which are disposed between element 28 and an abutment ring 38 also keyed to the ring gear assembly 21 by the splines 36. Element 28 and abutment member 38 have recesses for receiving the spring 37. Movement of these elements in response to the force of the springs is limited by stop plates 40 and 41. These stop plates are each of modified "Z" shape to provide a downwardly depending tongue 42 which is disposed in a recess in the ring gear assembly, a body portion 43 disposed between the outer surface of the ring gear and the inner surfaces of elements 28 or 38, and an upwardly extending ear 44 which projects slightly beyond the respective element 28 or 38 to serve as a stop for such element. These stop plates are shown more particularly in FIGS. 4 and 5. They constitute a novel mechanism for retaining the brake member 28 and the spring mechanism, for disengaging this brake member, in connection with the ring gear assembly.

Brake element 30 is also urged in a brake disengaging direction by a plurality of mousetrap-type springs 45, which are provided in connection with lever mechanisms 46 employed to transmit motion to the brake element 30 from a fluid pressure responsive actuator 47. In this instance, the actuator 47 constitutes an annular piston element which is disposed for movement in a correspondingly shaped chamber formed by the housing 10. Fluid under pressure may be introduced through a passage 48 to the chamber to effect the movement of the piston actuator 47. The lever mechanism 46 includes a plurality of lever elements 50, each of which is pivotally mounted at one end in the housing, as at 51, and has at the opposite end a roller element 52 for engagement with the actuator 47. Between the ends of each lever another roller 53 is provided, this roller being engaged with the brake element 30. The springs 45 urge the brake element 30 into engagement with the roller 53, causing the levers 50 to be urged in a direction to make the rollers 52 engage the actuator 47. These springs, together with coil springs 54, urge the actuator 47 toward an inactive position. Springs 54 are disposed between a stationary portion of the housing and one surface of the actuator 47. They are maintained in position by guide pins 55 secured to the actuator and projecting through openings formed in the housing.

In the operation of the brake mechanism, fluid under pressure is admitted through passage 48, by opening a suitable valve 56, to the annular piston chamber. This fluid causes actuator piston 47 to move toward the right, as viewed in FIG. 1, and to transmit force through levers 50 to the brake element 30. This element is moved toward element 27 and during such movement will engage element 28, moving it into engagement with element 27. The application of sufficient pressure to the piston chamber will cause element 28 to be clamped and held between elements 27 and 30. When element 28 is held stationary, the ring gear assembly will also be held stationary. Rotary motion may then be transmitted from the turbine wheel 12 and gear 18 to gear set 16. This gear set will then revolve within the ring gear assembly, transmitting rotary motion to the carrier 15 and shaft 26. After operation of the engine has been initiated, fluid pressure in the piston chamber may be reduced and springs 37, 45 and 54 will cause the disengagement of the braking surfaces. Power then transmitted to the gearing by the engine and the turbine will be modulated to drive alternator shaft 24 at the proper rate required to cause the alternator to generate current of the desired frequency.

In some instances, the engine may be rotating when it is desired to perform a starting operation. It has been found, in such instances, that the operation of the brake to lock the ring gear assembly will cause a generation of relatively high heat in the braking elements. This heat is sometimes so severe that the friction surfaces may melt and gall or fuse together. In other instances, the material of the braking surfaces will be eroded or otherwise separated from the elements 27, 28 and 30. This material may contaminate the oil utilized for the lubrication of the gearing. To avoid this oil contamination and improve the efficiency of the brake, it has been found desirable to coat the friction surfaces with materials which will quickly dissipate the heat and at the same time provide good braking characteristics. This coating of the friction surfaces also extends the active life of the brake mechanism. Good results have been secured by coating the braking surfaces of elements 27 and 30 with silver and the braking surfaces of element 28 with molybdenum. It has been found that a coating of from .003″ to .010″ of silver on the braking surfaces of elements 27 and 30 gives satisfactory results. The silver coating may be applied by plating. If desired, a thinner coating (.002″ to .003″) of silver could be applied over a coating (.008″ to .007″) of copper. Both of these metals have the desired heat conducting characteristics. It has also been found that a coating of molybdenum approximately .001″ thick on the braking surfaces of element 28 is also desirable and satisfactory. The silver coating provides a bearing surface which is useful during the initial application of the brake when the parts are rotating relative to one another and heat is generated. The silver quickly dissipates the heat, preventing hot spots from occurring. The molybdenum coating is applied by spraying, then polishing the sprayed surface with a relatively fine abrasive cloth. This method of application, together with the porous nature of the material, causes the element 28 to retain a thin film of oil even under the adverse loading conditions encountered during operation of the brake. Although silver serves as a bearing surface, the coefficient of friction between the sprayed molybdenum and the silver is sufficient to cause the relatively moving surfaces to come to a stop relatively quickly with proper loading.

In prior combination constant speed drive and engine starting devices, it was found that when the brake was applied by the application of fluid pressure, and fluid pressure was also introduced from the same source to the turbine to effect the initiation of the engine operation, there was a tendency for the brake to release. Inefficient starting and damage to the device would then result. To overcome this difficulty, the lever mechanism 50 has been supplied. This lever mechanism is so arranged that increased force will be transmitted thereby from the actuator 47 to the movable brake elements. Due to the multiplication of force by the lever mechanism, sufficient braking action will be secured even though the fluid pressure may be somewhat decreased. The provision of the metallic coatings on the braking elements increases the resistance of these elements to wear caused by the increased force resulting from the use of the lever mechanism 50. This metallic coating also decreases the tendency of the mechanism to contaminate the oil since heat generated will be quickly dissipated. The oil retained by the molybdenum coating will also lubricate the elements to further decrease wear.

While the means for securing the element 28 on the ring gear assembly shown in FIGS. 4 and 5 has been found satisfactory, the modified means shown in FIGS. 6 and 7 may also be used. In this modified form of securing mechanism, elements 28 and 38 are held in place by snap rings 57 and 58 which have been disposed in grooves formed in the ring gear assembly and in spring abutment ring 38. Snap ring 57 limits the movement of element 28 in a brake disengaging direction. Snap ring 58, being disposed in grooves formed in the ring gear assembly and abutment ring 38, retains the abutment ring in place on the ring gear assembly. To prevent this ring from being dislodged during operation of the mechanism, a clamp plate 60 is secured to one surface of the ring 38. This clamp plate has a block 61 which projects into the grooves for the snap ring and holds the ends of the snap ring in separated condition. In this condition the snap ring is retained in its expanded state wherein it engages the abutment ring and the splines on the ring gear assembly. The snap ring cannot be removed or dislodged without removing the clamp plate 60. This plate is held in snap ring locking position by a plurality of screws 62.

While the invention has been disclosed in only one of its many forms, it should be obvious that numerous minor changes could be made in the construction and relation of parts without departing from the spirit and scope of the invention as defined in the following claims.

We claim:

1. In a combination accessory drive and engine starting mechanism of the type having a housing, shaft means in the housing adapted to transmit rotary motion to and from an engine and an accessory, a fluid motor, a transmission operatively connecting said fluid motor and shaft means, means for applying fluid pressure from a source thereof to the fluid motor to impart rotary motion through the transmission to the shaft means, and brake means for resisting turning movement of a part of the transmission during a predetermined phase of operation of the mechanism, the improvement comprising:
 (a) fluid pressure responsive actauting means separate from said brake means and communicating with the source of fluid pressure for the fluid motor, said fluid pressure responsive actuating means having an annular piston member disposed for movement in an annular cylinder provided in the housing;
 (b) force-multiplying, motion-transmitting means disposed between said fluid pressure responsive actuating means and the brake means to effect the operation of the latter when fluid pressure is applied to said actuating means and fluid motor;
 (c) resilient means disposed to urge said annular piston member and said force-multiplying, motion-transmitting means in a brake-releasing direction;
 (d) additional resilient means for moving a part of the brake means in releasing direction; and
 (e) means for abutting said additional resilient means and limiting releasing movement of said part of the brake means, such abutting means and movement limiting means including a plurality of stop plates each having an interlocking relationship adjacent one end with a support therefor, such interlocking relationship being maintained by said part of the brake means and the means for abutting the additional resilient means.

2. The combination accessory drive and engine starting mechanism of claim 1 in which are provided means for supporting said part of the brake means for movement in brake applying and releasing directions, and the interlocking relationship between said stop plates and said supporting means is positioned at a single location relative to the length of said supporting means.

3. In a combination accessory drive and engine starting mechanism of the type having a housing, shaft means in the housing adapted to transmit rotary motion to and from an engine and an accessory, a fluid motor, a transmission operatively connecting said fluid motor and shaft means, means for applying fluid pressure from a source thereof to the fluid motor to impart rotary motion through the transmission to the shaft means, and brake means having a plurality of braking surfaces for engagement with a third element to resist turning movement of a part of the transmission during a predetermined phase of operation of the mechanism, the improvement comprising;
(a) fluid pressure responsive actuating means separate from said brake means and communicating with the source of fluid pressure for the fluid motor;
(b) force-multiplying, motion-transmitting means disposed between said fluid pressure responsive actuating means and the brake means to effect the operation of the latter when fluid pressure is applied to said actuating means and fluid motor; and
(c) a thin coating between .001" and .010" thick of different metallic brake lining materials on the engaging areas of said plurality of braking surfaces and said third element.

4. The combination accessory drive and engine starting mechanism of claim 3 in which at least one surface of each pair of engaging surfaces is silver-plated to a thickness of between .003" and .010".

5. The combination accessory drive and engine starting mechanism of claim 4 in which the other surface of each pair of engaging surfaces is provided with a coating of molybdenum approximately .001" thick.

6. The combination accessory drive and engine starting mechanism of claim 5 in which the molybdenum coating is sprayed on to a thickness of .001".

7. In a combination accessory drive and engine starting mechanism of the type having a housing, shaft means in the housing adapted to transmit rotary motion to and from an engine and an accessory, a fluid motor, a transmission operatively connecting said fluid motor and shaft means, means for applying fluid pressure from a source thereof to the fluid motor to impart rotary motion through the tranmission to the shaft means, and brake means for resisting turning movement of a part of the transmission during a predetermined phase of operation of the mechanism, the improvement comprising:
(a) fluid pressure responsive actuating means separate from said brake means and communicating with the source of fluid pressure for the fluid motor, said actuating means having an annular piston member disposed for movement in an annular cylinder provided in the housing;
(b) force-multiplying, motion-transmitting means disposed between said fluid pressure responsive actuating means and the brake means to effect the operation of the latter when fluid pressure is applied to said actuating means and fluid motor;
(c) resilient means provided to urge said annular piston member and said force-multiplying, motion-transmitting means in a brake releasing direction;
(d) means for supporting a part of the brake means for movement in brake applying and releasing directions;
(e) additional resilient means for moving said part of the brake means in a releasing direction;
(f) means for abutting said additional resilient means and limiting the movement of such part of the brake means in a releasing direction;
(g) means for locating at least one part of said abutting and movement-limiting means on said support means having a snap ring positioned in registering grooves in said support and said one part; and
(h) a clamp plate with a snap ring engaging block secured to said one part.

References Cited
UNITED STATES PATENTS

| | | | |
|---|---|---|---|
| 2,472,559 | 6/1949 | Arnold et al. | 74—785 |
| 2,908,189 | 10/1959 | Parker et al. | 74—675 |
| 2,966,237 | 12/1960 | Galleher | 188—71 |
| 2,986,238 | 5/1961 | Eaton | 188—251 |
| 2,989,149 | 6/1961 | Klaue | 188—152.86 |
| 3,003,588 | 10/1961 | Huntress | 192—107 |
| 3,047,097 | 7/1962 | Rockwell | 188—72 |
| 3,083,588 | 4/1963 | Christenson | 188—71 |

FOREIGN PATENTS

| | | |
|---|---|---|
| 575,929 | 3/1946 | Great Britain. |
| 816,169 | 7/1959 | Great Britain. |

ROBERT A. O'LEARY, *Primary Examiner.*

THOMAS C. PERRY, DONLEY J. STOCKING,
*Examiners.*